Figure 1:
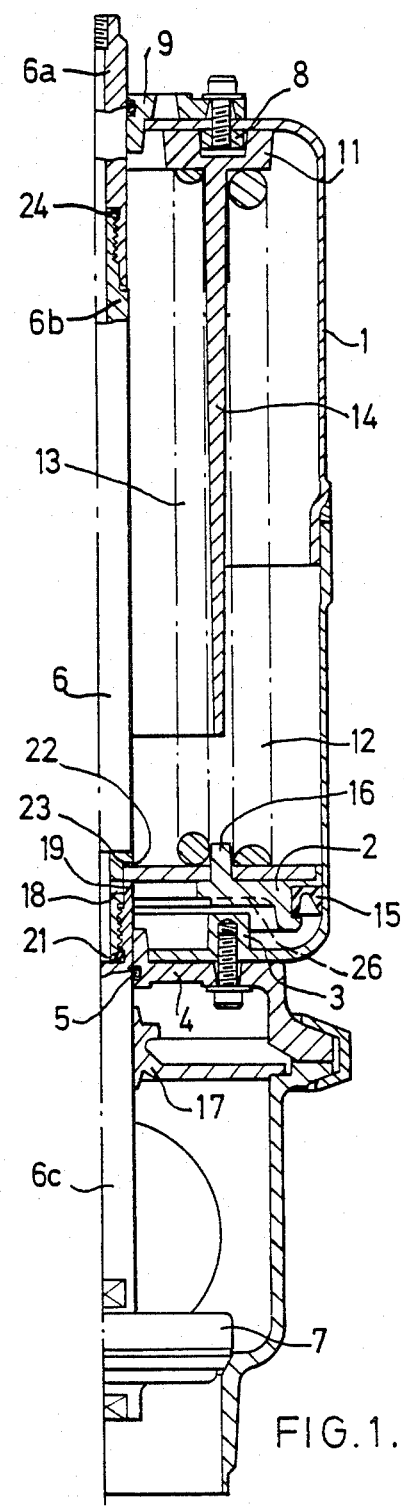

United States Patent [19]
Smith

[11] Patent Number: 4,523,515
[45] Date of Patent: Jun. 18, 1985

[54] VALVE OPERATING CYLINDER UNIT

[75] Inventor: David A. Smith, Horsham, England

[73] Assignee: APV Company Limited, England

[21] Appl. No.: 449,587

[22] Filed: Dec. 14, 1982

[30] Foreign Application Priority Data

Dec. 31, 1981 [GB] United Kingdom ............... 8139164

[51] Int. Cl.$^3$ ............................................ F01B 29/04
[52] U.S. Cl. ........................................ 92/59; 92/110;
92/128; 92/130 D; 92/165 PR; 92/166;
137/270
[58] Field of Search ............... 92/59, 109, 110, 130 R,
92/165 R, 165 PR, 166, 128, 255, 130 D;
403/343, 248; 137/270

[56] References Cited

U.S. PATENT DOCUMENTS

| 2,643,667 | 6/1953 | Dahl | 137/270 |
|---|---|---|---|
| 2,743,703 | 5/1956 | Miller | 92/110 |
| 2,903,011 | 9/1959 | Long | 137/270 |
| 2,937,622 | 5/1960 | Brimhall | 92/110 |
| 3,177,984 | 4/1965 | Taylor | 92/59 |
| 3,244,191 | 4/1966 | Grunau et al. | 92/59 |
| 3,313,215 | 4/1967 | Bieri | 92/165 R |
| 3,835,753 | 9/1974 | Bunyard | 92/165 PR |

FOREIGN PATENT DOCUMENTS

| 2459560 | 6/1976 | Fed. Rep. of Germany ... 92/165 PR |
|---|---|---|
| 936897 | 9/1963 | United Kingdom .................. 92/128 |

Primary Examiner—Robert E. Garrett
Assistant Examiner—Richard S. Meyer
Attorney, Agent, or Firm—Hamilton, Brook, Smith & Reynolds

[57] ABSTRACT

In order to enable a piston cylinder unit 1,2 with air entry through a hollow shaft 6, to be operated in either mode of operation with a single type of shaft, it is proposed in accordance with the invention to manufacture the shaft 6 in three parts, namely an upper air inlet portion 6a, an intermediate portion 6b which provides access for air to the cylinder via one or more apertures 18, and an operating end portion 6c. These three parts are threaded together and sealed by seals 21 and 24. Captive nuts 3 and 8 are provided at both ends of the cylinder so that the cylinder may be attached to a yoke 4 by either end, with the opposite end carrying a bearing 9 for the air inlet portion 6a of the shaft. If it is desired for the piston to operate in the opposite mode of operation, the portions 6a and 6c are interchanged and the cylinder is attached to the yoke using the captive nuts 8 rather than the nuts 3.

7 Claims, 2 Drawing Figures

U.S. Patent  Jun. 18, 1985  4,523,515

VALVE OPERATING CYLINDER UNIT

This invention relates to cylinder units for operating fluid flow control valves.

Fluid flow control valves, such as those used in process plant, are frequently operated by pneumatic piston/cylinder units. Such valves are made in a number of permutations and it is a considerable manufacturing convenience if a common unit may be usable with a wide variety of valve configurations, and in particular if a single acting cylinder, with spring return, is capable of being used either way up in relation to the valve on which it is mounted.

Also, this type of cylinder unit is known to be fed with air down the centre of the shaft, which then has to be hollow at the top, or air inlet, end and closed or solid at the bottom, or operating, end, to which a valve member is connected. Also, an air connection to the cylinder has to be provided from the hollow shaft at a fixed level in relation to the piston working in the cylinder and solid with the shaft.

These factors mean that a single acting unit with an entry down the shaft is not readily reversible and normally needs to be provided with a different design of shaft for each direction of action.

In accordance with the present invention, there is provided a pneumatically operable, single-acting piston/cylinder unit comprising an operating shaft which has a hollow portion to act as an operating air connection and in communication with the interior of the cylinder behind the piston, in which the said operating shaft has an air inlet end portion, an intermediate portion adapted to be anchored to the piston and including the connection to the interior of the cylinder, and an operating end portion adapted to be connected to a valve member or other element to be actuated by the unit, the said portions being threadedly connected together end to end, and each end of the intermediate portion being attachable sealingly to either the air inlet end portion or the operating end portion.

The requirement for cylinder actuation can either be spring above the piston or spring below the piston and thus by changing the shaft positions the cylinder/piston actuation may be reversed.

The piston may be prevented from rotation relative to the cylinder when in an extreme position, for example by engagement of the piston on captive nuts provided for mounting purposes.

The intermediate portion of the shaft may be prevented from rotation relative to the piston, for example by engagement with a flatted aperture, such as D-shaped.

Figure 2:
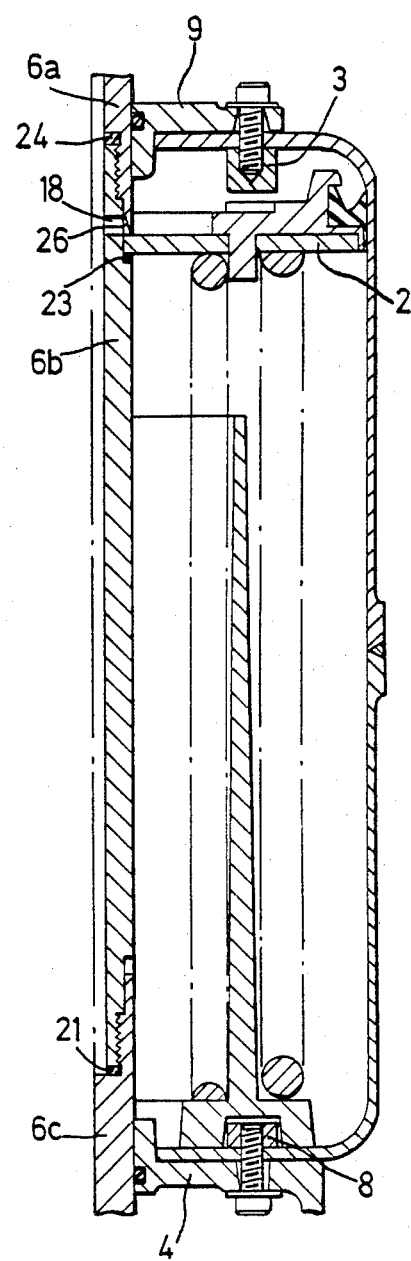

The invention will be further described with reference to the accompanying drawings, of which:

FIG. 1 is a vertical half section through a preferred form of piston/cylinder unit in accordance with the present invention, and associated parts of a flow control valve to be operated by the unit; and FIG. 2 is a similar view showing the unit in an alternative position.

Turning first to FIG. 1, there is shown a piston/cylinder unit comprising a cylinder 1 having a piston 2 reciprocable therein. The cylinder 1 is mounted by means of captive nuts 3 on a yoke 4 forming part of the control valve to be operated by the unit. The yoke is extended to form a bearing, including a seal 5, for a shaft 6 connected to a valve member 7. The upper end of the cylinder 1 has further captive nuts 8 which are used to support a bearing ring 9 for an upper portion of the shaft 6. The captive nuts 8 further act as locators for an annular spring abutment 11 against which bear two compression springs 12 and 13 which urge the piston 2 towards the valve closed position in the operating mode illustrated. The abutment 11 also has an axial tubular extension 14 which acts as a stroke limiter for the piston 2.

The piston 2 has a circumferential seal 15 co-operating with the inner wall of the cylinder 1 and is also provided with an abutment 16 engageable with the stroke limiter 14 and serving to locate the springs 12 and 13.

In accordance with the teachings of the present invention, the shaft 6 is divided into three threadedly engaged portions, namely an upper or air inlet portion 6a, an intermediate portion 6b and an operating end portion 6c to which the valve 7 is secured.

In addition to the seal 5, the piston cylinder unit is isolated from the interior of the valve by means of a double lip shaft seal 17, co-operating with the shaft portion 6c.

The air inlet portion 6a and intermediate portion 6b of the shaft are both hollow to admit air to the cylinder via one or more ports 18 in the intermediate portion 6b and corresponding gaps 19 provided in the end of the operating portion 6c. The operating portion 6c is essentially a solid shaft which closes off the lower end of the intermediate portion 6b and a seal 21 is provided between them. Similarly, a seal 24 is provided between the shaft portion 6a and 6b.

The piston 2 is engaged by a shoulder 22 on the shaft portion 6b and is pressed thereagainst by an end of the shaft portion 6c, with interposition of a seal 23. In order to prevent rotation of the piston 2 on the shaft portion 6b, a flatted, e.g. D-shaped, aperture in the piston 2 is engaged by correspondingly shaped portion of the shaft portion 6b.

It will be seen that when pneumatic pressure is admitted to the interior of the shaft, it is fed through the apertures 18 and 19 so as to enter the cylinder 1 below the piston 2 and moves the piston against the action of the springs 12 and 13 as far as the abutment with the stroke limiter 14. On venting of the shaft, the springs return the piston 2 to the illustrated position with the valve member 7 engaged upon its seat.

When the piston cylinder unit is not mounted upon a valve, the springs move the piston somewhat further so that it engages on the captive nuts 3 and recesses, illustrated by the reference numeral 26 to prevent relative rotation of the piston and cylinder in this position.

The shaft 6 is made in three portions so that the same components can be used if the piston cylinder unit is to be mounted in the reverse position as illustrated in FIG. 2.

It will be seen from this figure that the air inlet portion 6a of the shaft 6 is then attached to the piston end of the intermediate shaft portion 6b, while the operating portion 6c is attached to the other end. The captive nuts 3 are used to mount the bearing 9, while the captive nuts 8 are used to mount the cylinder onto the yoke 4.

In this mode of operation, the seal 21 acts to close the bottom end of the hollow intermediate shaft portion 6b, and air is admitted above the piston 2 via the aperture 18 and one or more gaps 26 formed between the air inlet shaft portion 6a and the piston 2.

It will thus be seen that common shaft portions may be used in both modes of operation, so that stocking of parts is simplified, and in addition any one of the three parts may be readily replaced if required without the need to replace the whole shaft. Also, different forms of the lower or operating end 6c may be used depending on the configuration of the valve.

When the piston cylinder unit is not actually attached to a valve member 7 or similar item to be actuated, it will be seen that there is no restraint on the piston 2 which can thus abut and be retained by the captive nuts 3. Since the shaft portion 6b is itself prevented from rotation relative to the piston 2, the threading on of the shaft portion 6a and 6c to the appropriate end is facilitated.

Various modifications may be made within the scope of the invention.

I claim:

1. In a single-acting piston/cylinder unit comprising a cylinder having first and second end walls, a piston within the cylinder for reciprocating between the first and second end walls and an operating shaft which has a hollow portion and an operating fluid connection in communication with the hollow portion and with a chamber in the interior of the cylinder defined between one side of the piston and the first end wall to supply operating fluid which drives the piston; the improvement being in that said operating shaft is made up of three portions, namely a fluid inlet end portion having a fluid inlet therethrough for supplying the operating fluid, an intermediate portion anchored to the piston, said intermediate portion including the hollow portion in communication with said fluid inlet and the operating fluid connection in communication with the interior of the cylinder to said one side of said piston, and an operating end portion to be connected to a valve member or other element to be actuated by the operating shaft, said three portions being threadedly connected together end to end and each end of the intermediate portion being attached sealingly to either the fluid inlet end portion or the operating end portion such that the orientation of the intermediate portion relative to the fluid inlet end portion and the operating end portion can be reversed while maintaining communication between said fluid inlet and said hollow portion to reverse orientation of the operating fluid connection relative to said piston, the fluid connection then being in communication with a second chamber in the interior of the cylinder defined between said one side of the piston and the second end wall such that the direction in which said piston is driven by the operating fluid introduced to the chamber through said operating fluid connection is reversed.

2. A piston/cylinder unit as claimed in claim 1, in which the cylinder includes means engageable with the piston to prevent relative rotation of the piston and cylinder when in an extreme end position.

3. A piston/cylinder unit as claimed in claim 2, in which the intermediate portion of the shaft is prevented from rotation relative to the piston.

4. A piston/cylinder unit as claimed in claim 1, in which the cylinder is adapted to be reversed in orientation relative to the fluid inlet end portion and the operating end portion and is provided with captive nuts to enable it to be secured by either end to a supporting part of the element to be actuated.

5. A piston/cylinder unit as claimed in claim 2, in which the cylinder is adapted to be reversed in orientation relative to the fluid inlet end portion and the operating end portion and is provided with captive nuts to enable it to be secured by either end to a supporting part of the element to be actuated.

6. A piston/cylinder unit as claimed in claim 5, in which said means to prevent relative rotation comprises the captive nuts at one end of the cylinder which cooperate with recesses in the piston to prevent relative rotation.

7. A piston/cylinder unit as claimed in claim 1 further comprising at least one return spring supported in the cylinder for driving the piston in a return direction opposite to the direction in which the piston is driven by the operating fluid, the cylinder being adapted to be reversed in orientation relative the fluid inlet end portion and the operating end portion to reverse the orientation of the return spring relative to the piston such that the direction in which the piston is driven by the return spring is reversed.

* * * * *